United States Patent
Hayakawa et al.

(10) Patent No.: US 11,502,305 B2
(45) Date of Patent: Nov. 15, 2022

(54) TITANIUM-BASED POROUS BODY AND METHOD OF PRODUCING THE SAME

(71) Applicant: TOHO TITANIUM CO., LTD., Kanagawa (JP)

(72) Inventors: Masashi Hayakawa, Kanagawa (JP); Syogo Tsumagari, Kanagawa (JP)

(73) Assignee: TOHO TITANIUM CO., LTD., Kanagawa (JP)

(*) Notice: Subject to any disclaimer, the term of this patent is extended or adjusted under 35 U.S.C. 154(b) by 0 days.

(21) Appl. No.: 16/960,230

(22) PCT Filed: Mar. 19, 2018

(86) PCT No.: PCT/JP2018/010907
§ 371 (c)(1),
(2) Date: Jul. 6, 2020

(87) PCT Pub. No.: WO2019/180797
PCT Pub. Date: Sep. 26, 2019

(65) Prior Publication Data
US 2021/0066723 A1  Mar. 4, 2021

(51) Int. Cl.
| | |
|---|---|
| B32B 15/18 | (2006.01) |
| H01M 4/80 | (2006.01) |
| B01D 39/20 | (2006.01) |
| B22F 1/00 | (2022.01) |
| B22F 3/11 | (2006.01) |
| H01M 4/86 | (2006.01) |

(52) U.S. Cl.
CPC ........ *H01M 4/803* (2013.01); *B01D 39/2027* (2013.01); *B22F 1/0007* (2013.01); *B22F 3/11* (2013.01); *H01M 4/8621* (2013.01); *B01D 2239/1291* (2013.01); *B22F 2301/205* (2013.01); *B22F 2304/10* (2013.01); *Y10T 428/12479* (2015.01)

(58) Field of Classification Search
CPC ............... B01D 39/20; B01D 39/2027; B01D 39/2037; B01D 2239/0485; B01D 2239/10; B01D 2239/1208; B01D 2239/1241; B01D 2239/1291; B22F 1/007; B22F 1/011; B22F 3/004; B22F 3/11; B22F 3/1103; B22F 7/002; B22F 2003/1042; B22F 2301/205; B22F 2304/10; B22F 2298/10; B22F 2999/00; C22C 1/0458; H01M 4/661; H01M 4/8621; H01M 4/8803; H01M 8/0232; H04M 4/803; Y02E 60/10; Y02E 60/50; Y10T 428/12479; Y10T 428/249953
USPC .............. 429/533, 245; 428/613, 304.4
See application file for complete search history.

(56) References Cited

U.S. PATENT DOCUMENTS

| | | | |
|---|---|---|---|
| 2004/0110059 A1* | 6/2004 | Onishi ............... | B22F 3/1109 429/410 |
| 2009/0162235 A1 | 6/2009 | Kita et al. | |
| 2015/0359635 A1 | 12/2015 | Kita et al. | |
| 2018/0021854 A1 | 1/2018 | Fukada et al. | |

FOREIGN PATENT DOCUMENTS

| | | | | |
|---|---|---|---|---|
| EP | 1361010 A1 | 11/2003 | | |
| JP | 2004-068112 A | 3/2004 | | |
| JP | 2005-015829 A | 1/2005 | | |
| JP | 2005-029834 A | 2/2005 | | |
| JP | 2006-28616 A | 2/2006 | | |
| JP | 2007-151805 A | 6/2007 | | |
| JP | 2010-272425 A | 12/2010 | | |
| JP | 2011-099146 A | 5/2011 | | |
| JP | 2012007223 A * | 1/2012 | | |
| JP | 2012-172179 A | 9/2012 | | |
| JP | 2012-184458 A | 9/2012 | | |
| JP | 2014065968 A * | 4/2014 | | |
| JP | 2016-094663 A | 5/2016 | | |
| JP | 2016094663 A * | 5/2016 | ............... | B22F 3/11 |
| JP | 2018-070985 A | 5/2018 | | |
| KR | 10-2017-0125077 A | 11/2017 | | |

OTHER PUBLICATIONS

Advanced Structural Engineering Guide Book, "Conducting Flexural Strength Test", 2017, Advanced Structural Engineering Guide Book, 13-33. (Year: 2017).*
K. Kapat et al. "Influence of Porosity and Pore-Size Distribution in Ti6AI4 V Foam on Physicomechanical Properties, Osteogenesis, and Quantitative Validation of Bone Ingrowth by Micro-Computed Tomography", 2017, ACS Applied Materials and Interfaces, 9(45), p. 39325-39248. (Year: 2017).*
N. Tuncer et al. "Investigation of spacer size effect on architecture and mechanical properties of porous titanium", 2011, Materials Science and Engineering A, 530, p. 633-642. (Year: 2011).*
Toho Titanium "Porous Titanium WEBTi-T", 2018 (Year: 2018).*
Notification of Transmittal of Translation of the International Preliminary Report on Patentability and Translation of Written Opinion of the International Searching Authority; PCT/JP2018/010907; dated Oct. 1, 2020.

(Continued)

*Primary Examiner* — Seth Dumbris
(74) *Attorney, Agent, or Firm* — Studebaker & Brackett PC

(57) ABSTRACT

To provide a titanium-based porous body that has high void fraction to ensure gas permeability and water permeability for practical use as an electrode and a filter, has a large specific surface area to ensure conductivity and sufficient reaction sites with a reaction solution or a reaction gas, thus showing excellent reaction efficiency, and contains less contaminants because of no organic substance used. A titanium-based porous body having a specific void fraction and a high specific surface area is obtained by filling an irregular-shaped titanium powder having an average particle size of 10 to 50 μm in a dry system without using any binder or the like into a thickness of $4.0 \times 10^{-1}$ to 1.6 mm, and sintering the irregular-shaped titanium powder at 800 to 1100° C.

12 Claims, No Drawings

(56) References Cited

OTHER PUBLICATIONS

An Office Action mailed by the Korean Intellectual Property Office dated Apr. 15, 2021, which corresponds to Korean Patent Application No. 10-2020-7023929 and is related to U.S. Appl. No. 16/960,230 with English language translation.
N/A, "Porous titanium WEBTi-T", Mar. 18, 2018, pp. 1-1, XP055805144, URL: https://web.archive.org/web/20180318124459/https://www.toho-titanium.co.jp/en/products/webtihp.html.
The extended European search report issued by the European Patent Office dated May 28, 2021, which corresponds to European Patent Application No. 18910488.8-1103 and is related to U.S. Appl. No. 16/960,230.
An Office Action; "Decision on Opposition," issued by the Japanese Patent Office dated Nov. 20, 2019, which corresponds to Japanese Patent Application No. 2016-216121 with English language translation.
An Office Action; "Notice of Reasons for Refusal," issued by the Japanese Patent Office dated Dec. 12, 2018, which corresponds to Japanese Patent Application No. 2016-216121 with English language translation.
An Office Action; "Written Opposition to Patent," issued by the Japanese Patent Office dated Sep. 18, 2019, which corresponds to Japanese Patent Application No. 2016-216121 with English language translation.
International Search Report issued in PCT/JP2018/010907; dated Jun. 19, 2018.
An Office Action; "Notice of Final Rejection," mailed by the Korean Intellectual Property Office dated Oct. 25, 2021, which corresponds to Korean Patent Application No. 10-2020-7023929 and is related to U.S. Appl. No. 16/960,230; with English language translation.
An Office Action; "Notice of Final Rejection," mailed by the Korean Intellectual Property Office dated Jan. 10, 2022, which corresponds to Korean Patent Application No. 10-2020-7023929 and is related to U.S. Appl. No. 16/960,230; with English language translation.
An Office Action; "Decision of Rejection for Amendment," mailed by the Korean Intellectual Property Office dated Jan. 10, 2022, which corresponds to Korean Patent Application No. 10-2020-7023929 and is related to U.S. Appl. No. 16/960,230; with English language translation.
An Office Action mailed by China National Intellectual Property Administration dated Jan. 5, 2022, which corresponds to Chinese Patent Application No. 201880090535.9 and is related to U.S. Appl. No. 16/960,230 with English language translation.
An Office Action mailed by China National Intellectual Property Administration dated May 19, 2022, which corresponds to Chinese Patent Application No. 201880090535.9 and is related to U.S. Appl. No. 16/960,230 with English language translation.

* cited by examiner

TITANIUM-BASED POROUS BODY AND METHOD OF PRODUCING THE SAME

FIELD OF INVENTION

The present invention relates to a titanium-based porous body produced using a titanium-based powder as raw material, the porous body being used in an electrode of a secondary battery or a fuel battery or a filter, or the like, and also relates to a method of producing the same.

BACKGROUND ART

Recently, titanium-based porous body has been considered for use in an electrode of a secondary battery and an electrode of a fuel battery. A method is desired for producing a titanium-based porous body having a high void fraction and conductivity, which are properties required for electrodes of batteries.

A method is conventionally known in which titanium fibers are sintered to produce a titanium-based porous body having a high void fraction (see, for example, PTL 1). However, a titanium-based porous body produced by sintering fibers indeed has a high void fraction of 70 to 90%, but has a small specific surface area and has a small junction area where fibers are sintered with each other. Thus, such a titanium-based porous body has a problem of low conductivity. For example, when such a titanium-based porous body supports a catalyst thereon and is used as a carrier to allow gas or liquid to react in the vicinity of the surface of the titanium-based porous body, such a small specific surface area leads to a problem of lowering the reaction efficiency due to reduction in the reaction sites between the titanium-based porous body and the reaction solution or the reaction gas.

In addition, a method is known in which a paste binder is kneaded into titanium powder, which is then sintered to produce a titanium-based porous body that has through-holes and is capable of allowing a liquid substance to flow from one side to the other side (see, for example, PTL 2). However, in the method in which a binder is kneaded, followed by sintering, the production steps are complicated and the carbon content in the sintered body may be increased. In addition, the void fraction is as low as 10 to 50%, which leads to a problem of deterioration in the gas permeability and water permeability.

Furthermore, a titanium-based porous body is known which is produced by sintering a gas-atomized titanium powder without using a paste (see, for example, PTL 3). However, since a titanium powder having a high bulk density is used, a titanium-based porous body having a void fraction of 55% or more cannot be produced, and thus, there is a problem of deterioration in the gas permeability and water permeability.

CITATION LIST

Patent Literature

PTL 1: JP-A-2012-172179
PTL 2: JP-A-2011-99146
PTL 3: JP-A-2004-68112

SUMMARY OF INVENTION

Technical Problem

The present invention has been made in view of the above circumstances. A problem that the present invention is to solve recites in provision of a titanium-based porous body that has a high specific surface area to show an excellent reaction efficiency and that has a high void fraction to ensure the gas permeability and water permeability.

Solution to Problem

As a result of intensive studies for solving the above problem, the present inventors have completed the following inventions.

[1] A sheet-like titanium-based porous body having a specific surface area of $4.5 \times 10^{-2}$ to $1.5 \times 10^{-1}$ m$^2$/g, a void fraction of 50 to 70%, a thickness of $4.0 \times 10^{-1}$ to 1.6 mm, and a surface roughness of at least one surface of 8.0 μm or less.

[2] A method of producing a sheet-like titanium-based porous body, the method comprising placing an irregular-shaped titanium-based powder having an average particle size of 10 to 50 μm, a D90 less than 75 μm, and an average circularity of 0.50 to 0.90 on a setter in a dry system without pressurization, and sintering the irregular-shaped titanium-based powder at 800 to 1100° C.

[3] The method of producing a sheet-like titanium-based porous body according to [2], wherein a material of the setter is quartz.

[4] An electrode comprising the sheet-like titanium-based porous body according to [1].

Advantageous Effects of Invention

The present invention can provide a titanium-based porous body that is capable of retaining good conductivity, gas permeability, and water permeability while maintaining a bending strength required for practical use, by controlling the specific surface area and void fraction of the titanium-based porous body.

DESCRIPTION OF EMBODIMENTS

Specific embodiments of the present invention will be described in detail below.

<Specific Surface Area, Void fraction, and Surface Roughness>

The titanium-based porous body of the present invention has a specific surface area of $4.5 \times 10^{-2}$ to $1.5 \times 10^{-1}$ m$^2$/g, a void fraction of 50 to 70%, and a surface roughness of one surface of 8.0 μm or less.

First, the titanium-based porous body preferably has a specific surface area of $5.0 \times 10^{-2}$ to $1.3 \times 10^{-1}$ m$^2$/g and a void fraction of 55 to 68%, and more preferably has a specific surface area of $7.0 \times 10^{-2}$ to $1.1 \times 10^{-1}$ m$^2$/g and a void fraction of 60 to 66%. By setting the values in the above ranges, good conductivity, gas permeability, and water permeability can be retained while maintaining a bending strength required for practical use. The specific surface area of the present invention was measured by a BET method according to JIS Z 8831:2013. As a measurement gas, krypton was used.

Next, the surface roughness of at least one surface is 8.0 μm or less. The lower limit of the surface roughness is not limited, but is preferably 0.1 μm or more. The surface roughness in the present invention is the arithmetic mean roughness Ra determined according to JIS B 0601-2001.

In addition, the void fraction in the present invention is a pore ratio per unit volume of the titanium-based porous body in percentage. The void fraction can be calculated according to the following formula based on the volume V (cm$^3$) of the titanium-based porous body, the mass M (g) of the titanium-based porous body, and the true density D (g/cm$^3$) of the titanium-based material (for example, in the case of pure titanium, the true density is 4.51 g/cm$^3$).

Void fraction (%)=(1−(M/V)/D)×100   (A)

<Carbon Concentration>

The carbon concentration of the titanium-based porous body of the present invention is 0.05% by weight or less, more preferably 0.03% by weight or less. Due to such a low carbon concentration in the porous body, the titanium-based porous body of the present invention is advantageously free from the reduction in the strength and increase in the electric resistance which may be caused by the effect of contamination with impurities.

<Thickness>

The titanium-based porous body of the present invention has a thickness of $4.0\times10^{-1}$ to 1.6 mm. The thickness is more preferably $4.0\times10^{-1}$ to 1.0 mm, and further preferably $4.0\times10^{-1}$ to $6.0\times10^{-1}$ mm. Within this range, the size of the final product can be reduced while maintaining a bending strength required for practical use. When the thickness of the titanium-based porous body is less than $4.0\times10^{-1}$ mm, the uniformity of the pores in the titanium-based porous body is reduced, leading to reduction in the bending strength of the titanium-based porous body. When the thickness of the titanium-based porous body is larger than 1.6 mm, it is difficult to use the porous body in a secondary battery which has been increasingly miniaturized.

<Material>

The titanium-based porous body of the present invention is composed of pure titanium, a titanium alloy, pure titanium or a titanium alloy coated with titanium nitride or titanium silicide, or a composite material or the like of a combination thereof. Pure titanium is titanium that is composed of metallic titanium and other inevitable impurities. A titanium alloy is an alloy of titanium and any metal, such as Fe, Sn, Cr, Al, V, Mn, Zr, or Mo, and specific examples thereof include Ti-6-4 (Ti-6Al-4V), Ti-5Al-2.5Sn, Ti-8-1-1 (Ti-8Al-1Mo-1V), Ti-6-2-4-2 (Ti-6Al-2Sn-4Zr-2Mo-0.1Si), Ti-6-6-2 (Ti-6Al-6V-2Sn-0.7Fe-0.7Cu), Ti-6-2-4-6 (Ti-6Al-2Sn-4Zr-6Mo), SP700 (Ti-4.5Al-3V-2Fe-2Mo), Ti-17 (Ti-5Al-2Sn-2Zr-4Mo-4Cr), β-CEZ (Ti-5Al-2Sn-4Zr-4Mo-2Cr-1Fe), TIMETAL 555, Ti-5553 (Ti-5Al-5Mo-5V-3Cr-0.5Fe), TIMETAL 21S (Ti-15Mo-2.7Nb-3Al-0.2Si), TIMETAL LCB (Ti-4.5Fe-6.8Mo-1.5Al), 10-2-3 (Ti-10V-2Fe-3Al), Beta C (Ti-3Al-8V-6Cr-4Mo-4Cr), Ti-8823 (Ti-8Mo-8V-2Fe-3Al), 15-3 (Ti-15V-3Cr-3Al-3Sn), and Beta III (Ti-11.5Mo-6Zr-4.5Sn), and Ti-13V-11Cr-3Al.

In particular, a titanium-based porous body composed of pure titanium, pure titanium coated with titanium nitride or titanium silicide, or a composite material of a combination thereof is preferred since the electric resistance when used in an electrode can be reduced, and a titanium-based porous body composed of pure titanium is more preferred.

<Method of Producing Titanium-Based Porous Body>
<Nature of Titanium Powder>

The titanium-based powder used in production of the titanium-based porous body of the present invention is an irregular-shaped titanium-based powder that has (1) an average particle size (D50 by volume) of 10 to 50 μm, (2) a D90 less than 75 μm, and (3) an average circularity of 0.50 to 0.90. These properties will be described below.

(1) Average Particle Size (D50)

When the average particle size is more than 50 μm, the specific surface area of the sintered body is less than $4.5\times10^{-2}$ m$^2$/g. On the other hand, with an average particle size less than 10 μm, it is difficult to handle the titanium-based powder. The average particle size, as used herein, refers to the particle size D50 (median size) in the particle size distribution (by volume) obtained by a laser diffraction scattering method.

(2) D90

An irregular-shaped titanium-based powder having a particle size D90 in the particle size distribution (by volume) less than 75 μm is preferred. With a D90 less than 75 μm, a sintered body having high strength can be produced.

In addition, the surface roughness of the titanium-based porous body depends on the particle size D90, and the less the D90, the lower the surface roughness and the higher the strength of the titanium-based porous body. The D90 refers to a particle size corresponding to an integrated value of 90% in the volume distribution as determined by a particle size distribution measurement by a laser diffraction scattering method.

(3) Irregular-Shaped Titanium-Based Powder Having Average Circularity of 0.50 to 0.90

An irregular-shaped titanium-based powder means a titanium-based powder that contains primary particles not having the perfect sphere shape or a perfect sphere-like shape and having an average circularity of 0.50 to 0.90. Examples of irregular-shaped titanium-based powders include a titanium-based powder produced by an HDH method and a titanium-based powder produced by a grinding method, and a titanium-based powder that is a blend thereof. The shape of the titanium-based powder obtained by the above production method is irregular and non-spherical. When a titanium-based powder having an average circularity of the primary particles more than 0.90 is used, the specific surface area of the sheet-like titanium-based porous body is less than $4.5\times10^{-2}$ m$^2$/g and the void fraction thereof is less than 50%.

As used herein, the circularity is defined as follows: when the circumferential length (A) of a projected area of a particle is measured with an electronic microscope or anatomic microscope and the circumferential length of the circle having the same area as the projected area is taken as (B), B/A is calculated as the circularity. In addition, the average circularity is, for example, obtained as follows: particles are allowed to flow together with a carrier liquid through a cell, images of a large number of particles are captured with a CCD camera, the circumferential length (A) of a projected area of each particle and the circumferential length (B) of the circle having the same area as the projected area are measured in images of 1000 to 1500 particles to then calculate the circularity, and the average of the circularities of the particles is calculated and taken as the circularity of the particles. The value of the circularity is larger as the shape of the particle is closer to the perfect sphere and the circularity of a particle having a perfect spherical shape is 1. Conversely, the circularity is smaller as the shape of a particle is farther from the perfect sphere.

The titanium-based powder used in the present invention is pure titanium powder, a titanium alloy powder, a hydrogenated pure titanium powder or titanium alloy powder, or a pure titanium powder or titanium alloy powder coated with titanium nitride or titanium silicide. Pure titanium powder is a titanium powder composed of metallic titanium and other inevitable impurities. The same examples as mentioned above can apply to the titanium alloy for the titanium alloy powder. In particular, pure titanium powder, a hydrogenated pure titanium powder, a pure titanium powder coated with titanium nitride or titanium silicide, or a composite material of a combination thereof is preferred, and pure titanium powder is particularly preferred.

In the method of producing a titanium-based porous body of the present invention, an irregular-shaped titanium-based powder having an average particle size of 10 to 50 µm, a D90 less than 75 µm, and an average circularity of 0.50 to 0.90 is placed on a setter in a dry system without pressurization. Since the powder is densely filled than in the case of its own weight only, it is difficult to produce a titanium-based porous body having a void fraction larger than 70%.

The setter may be made of any material, such as quartz or BN, that hardly reacts with the titanium-based porous body. Regarding the shape, a flat plate-shaped setter or a flat plate-shaped setter provided with a counterbore can be used, and a flat plate-shaped setter provided with a counterbore is particularly preferred. The counterbore, as used herein, refers to a portion with a hole that has an edge on the circumference thereof and that does not pierce the plate, or a portion surrounded by partitions. The bottom of the counterbore may be flat and the shape of the counterbore is more preferably the same as the shape of the final product.

When a flat plate-shaped setter is used, a method of placing a titanium-based irregular-shaped powder includes the following (1) and (2) etc.

(1) a method of naturally dropping the irregular-shaped titanium-based powder from above the setter to place the powder on the setter; and (2) a method of placing a frame-like powder-filling jig of a product size on the setter, naturally dropping the irregular-shaped titanium-based powder from above the setter, and filling the powder-filling jig just full with the irregular-shaped titanium-based powder without pressurizing the irregular-shaped titanium-based powder.

When a setter provided with a counterbore is used, there is (3) a method of putting the titanium-based irregular-shaped powder into a counterbore by natural dropping, and leveling the powder brimming over the counterbore with a plate-like jig without pressurizing the titanium-based irregular-shaped powder.

In particular, the methods of (2) and (3) are preferred in that the powder remaining in the jig or in the counterbore defines the product size as it is.

The site on which the titanium-based irregular-shaped powder is placed (the surface of the setter or the bottom surface of the counterbore) preferably has a surface roughness of 1.5 µm or less. Within this range, the surface roughness of at least one surface of the sheet-like titanium-based porous body can be 8.0 µm or less.

<Placement of Titanium-Based Powder>

By placing the titanium-based powder without applying pressure (without pressurization), bridging within the titanium powder occurs in a natural state, and a sintered body of the titanium-based porous body having a void fraction of 50 to 70% can be obtained. As used herein, the "without pressurization" refers to a state where no stress is intentionally applied onto the surface of the filled titanium powder, and only a stress that is involved with the leveling of the powder in the direction parallel to the setter is applied on the surface of the titanium powder during filling of the powder. In addition, the "bridging", as used herein, refers to forming arch-like pores by a powder.

Furthermore, the filling with the titanium-based powder is preferably performed in a dry system. Filling with a powder in a dry system can lead to bridging within the powder in a natural state to provide a sintered body having a high void fraction. As used herein, "in a dry system" refers to a state where the powder is not intentionally mixed with water or an organic solvent. When a titanium-based powder is filled in a wet system, the titanium-based powder accumulates in an anisotropic manner by the resistance of a fluid and it is difficult to attain high void fraction. In addition, when an organic solvent is used, the carbon concentration becomes as high as 0.1% by weight or higher, and the strength of a sintered body of the titanium-based porous body may be reduced and the electric resistance may be increased due to contamination with impurities.

<Sintering of Titanium-Based Powder>

The resulting accumulated body of the titanium-based powder is sintered at 800 to 1100° C. When a quartz setter is used, sintering is preferably performed at 800 to 100° C. By sintering at a temperature in this range, a sintered body having a strength required for practical use and having a smooth surface can be produced. The time for sintering is preferably 1 to 3 hours.

When a hydrogenated pure titanium powder or titanium alloy powder is used as irregular-shaped titanium-based powder of raw material, there may be mentioned a method in which the powder is once kept at 400 to 600° C. before the sintering step to perform a dehydrogenation step for eliminating hydrogen contained in the powder, thereby producing a porous body having a higher bending strength that is equal to one produced by using an HDH powder as raw material.

<Conclusion of Methods for Producing Titanium-Based Powder>

As described above, a titanium-based powder having a specific average particle size and shape is used and is molded and calcined under specific conditions, whereby the sheet-like titanium-based porous body of the present invention can be obtained.

For example, as the average particle size of the titanium-based powder increases, the specific surface area of the sheet-like titanium-based porous body decreases and the void fraction increases. In addition, as the circularity of the titanium-based powder increases, the void fraction of the sheet-like titanium-based porous body decreases. The tendency of the circularity of the titanium-based powder with respect to the specific surface area of the sheet-like titanium-based porous body shows a variation that has a peak at a certain value. As the sintering temperature increases, the specific surface area and the void fraction of the sheet-like titanium-based porous body decrease. By controlling these parameters, the specific surface area and the void fraction of the sheet-like titanium-based porous body can be adjusted.

The thickness of the sheet-like titanium-based porous body can be adjusted by the thickness of the titanium-based irregular-shaped powder placed, the height of the jig, or the depth of the counterbore. In addition, the surface roughness of one surface of the sheet-like titanium-based porous body can be adjusted by the surface roughness of the setter or the bottom surface of the counterbore on which the titanium-based powder is placed.

EXAMPLES

The present invention will be described more specifically below with respect to Examples and Comparative Examples, but the present invention is not to be limited to the Examples.

The equipment and conditions used in the Examples are shown below.

1. Raw Material Titanium-Based Powder

1) Production method: hydrogenation and dehydrogenation method

2) Method of measuring average particle size and particle size distribution: they were measured according to JIS Z 8825:2013 using LMS-350 (manufactured by Seishin Enterprise Co., Ltd.). The particle sizes D50 and D90 corresponding to the integrated value of 50% and 90% in the volume distribution were obtained from the obtained particle size distribution (by volume).

3) Method of measuring average circularity: measurement was performed using PITA3 manufactured by Seishin Enterprise Co., Ltd. Specifically, particles are allowed to flow together with a carrier liquid through a cell, and images of a large number of particles are captured by a CCD camera. From each particle image, the circumferential length (A) of a projected area of the particle and the circumferential length (B) of the circle having the same area as the projected area were measured, and based on the circumferential length (A) of the projected area and the circumferential length (B) of the circle having the same area as the projected area, B/A was calculated as the circularity. For each of 1000 to 1500 particles, the circularity was measured, and the average was taken as the average circularity.

2. Sintering Conditions

1) Setter: quartz setter with counterbore (size of counterbore: 60×60×0.5 tmm, surface roughness of bottom surface of counterbore: 0.76 μm)
2) Vacuum degree: $3.0 \times 10^{-3}$ Pa
3) Temperature increase rate: 15° C./min
4) End point temperature: 900° C. (retention time: 1 hour)
5) Cooling method: cooling in furnace from 900° C. to 100° C.

3. Analysis Method

1) Void fraction: calculated by the above formula (A).
2) Specific surface area: measure using BET method according to JIS Z 8831:2013 using ASAP 2460 (manufactured by Micromeritics).

Adsorption gas: krypton, pretreatment conditions: $N_2$ flowing method (120° C.×1 hour), measurement temperature: −196° C.

3) Conductivity: measured according to JIS K 7194 using MCP-T610 (manufactured by Mitsubishi Chemical Corporation).
4) Surface roughness: measured according to JIS B 0601-2001 using Surftest SJ-310 (manufactured by Mitutoyo Corporation).
5) Bending strength: measured according to JIS Z 248 using 5582 type universal tester (manufactured by Instron). It was evaluated based on the maximum load (N) measured under test conditions of a plunger diameter of 5 mm, a receiving tool of 3R edge, a distance between external fulcrums of 40 mm, and a testing rate of 4 mm/min.
6) Method of measuring carbon concentration: it was measured by an infrared absorption method after combustion using EMIA-920V2 manufactured by Horiba Ltd. A 0.5 g sample, metallic tin, and metallic tungsten were put into an alumina crucible, and were heated and combusted by high frequency current under oxygen gas flow, and generated $CO_2$ was detected and quantified by infrared ray to determine the carbon concentration in the sample.

A. Effects of Properties of Raw Material Powder (Irregular-Shaped Titanium-Based Powder)

In the method of producing a sheet-like titanium-based porous body according to the present invention, an irregular-shaped titanium-based powder having a specific particle size distribution and circularity is used as raw material powder. The particle size distribution and the circularity were varied to investigate the effects thereof.

Example 1

An HDH titanium powder having an average particle size (D50) of 30 μm (D90: 47 μm) and an average circularity of 0.78 was filled onto a quartz setter with counterbore, the counterbore having a depth of 0.50 mm and a surface roughness of the bottom surface of 0.76 μm, and the filled HDH titanium powder was sintered under the sintering conditions mentioned above, thereby producing a titanium-based porous body.

The resulting titanium-based porous body had a thickness of 0.47 mm, a void fraction of 64%, a specific surface area of $8.4 \times 10^{-2}$ m$^2$/g, a surface roughness of the surface that had been in contact with the quartz setter with counterbore (the same applies to the following Examples) of 3.7 μm, a conductivity of $2.96 \times 10^3$ S/cm, and a maximum load as measured by the bending test of 5.9 N. In addition, the carbon concentration in the titanium-based porous body was 0.02'.

Example 2

A titanium-based porous body was produced under the same conditions as in Example 1 except for using an HDH titanium powder having an average particle size (D50) of 12 μm (D90: 19 μm) and an average circularity of 0.88 as raw material.

The resulting titanium-based porous body had a thickness of 0.45 mm, a void fraction of 58%, a specific surface area of $1.1 \times 10^{-1}$ m$^2$/g, a surface roughness of 2.4 μm, a conductivity of $3.15 \times 10^3$ S/cm, and a maximum load as measured by the bending test of 14.7 N.

In addition, the carbon concentration in the titanium-based porous body was 0.01%.

Example 3

A titanium-based porous body was produced under the same conditions as in Example 1 except for using an HDH titanium powder having an average particle size (D50) of 50 μm (D90: 74 μm) and an average circularity of 0.82 as raw material.

The resulting titanium-based porous body had a thickness of 0.52 mm, a void fraction of 59%, a specific surface area of $4.9 \times 10^{-2}$ m$^2$/g, a surface roughness of 6.0 μm, a conductivity of $2.02 \times 10^3$ S/cm, and a maximum load as measured by the bending test of 4.6 N.

In addition, the carbon concentration in the titanium-based porous body was 0.03%.

Comparative Example 1

A titanium-based porous body was produced under the same conditions as in Example 1 except for using a spherical titanium powder having an average particle size (D50) of 32 μm (D90: 48 μm) and an average circularity of 0.94 as raw material.

The resulting titanium-based porous body had a thickness of 0.49 mm, a void fraction of 44%, a specific surface area of $4.3 \times 10^{-2}$ m$^2$/g, a surface roughness of 3.3 μm, a conductivity of $5.28 \times 10^3$ S/cm, and a maximum load as measured by the bending test of 22.2 N.

Comparative Example 2

A titanium-based porous body was produced under the same conditions as in Example 1 except for using an HDH titanium powder having an average particle size (D50) of 90 μm (D90: 107 μm) and an average circularity of 0.80 as raw material.

The resulting titanium-based porous body had a thickness of 0.47 mm, a void fraction of 63%, a specific surface area of $3.3 \times 10^{-2}$ m$^2$/g, a surface roughness of 8.4 μm, a conductivity of $1.31 \times 10^3$ S/cm, and a maximum load as measured by the bending test of 1.6 N.

Comparative Example 3

A titanium-based porous body was produced under the same conditions as in Example 1 except for using titanium fibers having a dimension of φ20 μm×2.5 mm (the average circularity was not measurable) as raw material.

The resulting titanium-based porous body had a thickness of 0.51 mm, a void fraction of 80 s, a specific surface area of $5.4 \times 10^{-2}$ m$^2$/g, a surface roughness of 18 μm, a conductivity of $1.27 \times 10^3$ S/cm, and a maximum load as measured by the bending test of 3.4 N.

The above results were arranged in tables to obtain the following Table 1 (Properties of Raw Material Powder) and Table 2 (Properties of Titanium-Based Porous Body).

TABLE 1

Properties of Raw Material Powder

|  | Average particle size (D50) μm | D90 μm | Average circularity |
|---|---|---|---|
| Example 1 | 30 | 47 | 0.78 |
| Example 2 | 12 | 19 | 0.88 |
| Example 3 | 50 | 74 | 0.82 |
| Comparative Example 1 | 32 | 48 | 0.94 |
| Comparative Example 2 | 90 | 107 | 0.80 |
| Comparative Example 3 | fibers (d: 20 μm, l: 2.5 mm) |  | Not measurable |

TABLE 2

Properties of Titanium-based Porous Body

|  | Specific surface area m$^2$/g | Void fraction % | Thickness mm | Surface roughness μm | Conductivity S/cm | Maximum load N |
|---|---|---|---|---|---|---|
| Example 1 | $8.4 \times 10^{-2}$ | 64 | 0.47 | 3.7 | 2960 | 5.9 |
| Example 2 | $1.1 \times 10^{-1}$ | 58 | 0.45 | 2.4 | 3150 | 14.7 |
| Example 3 | $4.9 \times 10^{-2}$ | 59 | 0.52 | 6.0 | 2020 | 4.6 |
| Comparative Example 1 | $4.3 \times 10^{-2}$ | 44 | 0.49 | 3.3 | 5280 | 22.2 |
| Comparative Example 2 | $3.3 \times 10^{-2}$ | 63 | 0.47 | 8.4 | 1310 | 1.6 |
| Comparative Example 3 | $5.4 \times 10^{-2}$ | 80 | 0.51 | 18 | 1270 | 3.4 |

As is clear from the results of Table 1 and Table 2, in the method of producing a sheet-like titanium-based porous body according to the present invention, by using, as raw material, an irregular-shaped titanium-based powder having a D50 of 10 to 50 μm, a D90 less than 75 μm, and an average circularity of 0.50 to 0.90 as defined in claim 2, a sheet-like titanium-based porous body having a preferred specific surface area, void fraction, thickness, and surface roughness as defined in claim 1 can be produced, the sheet-like titanium-based porous body being excellent in the conductivity and strength properties.

The case of using a titanium-based powder having an average circularity outside the above range (Comparative Example 1), the case of using titanium-based powder having a D50 and D90 outside the above ranges (Comparative Example 2), and the case of using titanium fibers as raw material (Comparative Example 3) did not result in a good sheet-like titanium-based porous body.

B. Effect of Sintering Temperature

In the method of producing a sheet-like titanium-based porous body according to the present invention, the end point temperature in sintering was 800 to 1100° C. The effect was investigated.

Comparative Example 4

A titanium-based porous body was produced under the same conditions as in Example 1 except that the temperature increase rate was 12° C./min and the end point temperature was 700° C.

The resulting titanium-based porous body had a thickness of 0.49 mm, a void fraction of 73%, a specific surface area of $1.1 \times 10^{-1}$ m$^2$/g, a surface roughness of 4.5 μm, a conductivity of $4.76 \times 10^2$ S/cm, and a maximum load as measured by the bending test of 0.5 N.

Example 4

A frame-like powder-filling jig having a height from the surface of a BN setter (surface roughness 1.1 μm) of about 0.50 mm was used to fill the HDH titanium powder of Example 1 on the BN setter. The temperature was increased at a rate of 10° C./min under an atmosphere of a vacuum degree of $3.0 \times 10^{-3}$ Pa, and was kept at an end point temperature of 1100° C. for 1 hour, and then the furnace was cooled, thereby producing a titanium-based porous body.

The resulting titanium-based porous body had a thickness of 0.46 mm, a void fraction of 57 s, a specific surface area of $6.7 \times 10^{-2}$ m$^2$/g, a surface roughness of 4.3 μm, a conductivity of $3.55 \times 10^3$ S/cm, and a maximum load as measured by the bending test of 9.8 N.

In addition, the carbon concentration in the titanium-based porous body was 0.03%.

Comparative Example 5

A titanium-based porous body was tried to be produced in the same manner as in Example 4 except for changing the end point temperature from 1100° C. to 1200° C. However, the powder and the setter were reacted and the resulting titanium-based porous body was unable to be peeled from the setter, thus failing to produce a titanium-based porous body.

The above results were arranged in a table to obtain the following Table 3 (Relationship between Properties of Sheet-like Titanium-based Porous Body and Sintering Temperature).

TABLE 3

Relationship between Properties of Sheet-like Titanium-based Porous Body and Sintering Temperature

| (Sintering temperature in parentheses) | Specific surface area m²/g | Void fraction % | Thickness mm | Surface roughness μm | Conductivity S/cm | Maximum load N |
|---|---|---|---|---|---|---|
| Example 1 (900° C.) | $8.4 \times 10^{-2}$ | 64 | 0.47 | 3.7 | 2960 | 5.9 |
| Comparative Example 4 (700° C.) | $1.1 \times 10^{-1}$ | 73 | 0.49 | 4.5 | 476 | 0.5 |
| Example 4 (1100° C.) | $6.7 \times 10^{-2}$ | 57 | 0.46 | 4.3 | 3550 | 9.8 |
| Comparative Example 5 (1200° C.) | — | — | — | — | — | — |

As is clear from the results of Table 3, in the method of producing a sheet-like titanium-based porous body of the present invention, when the end point temperature of the baking temperature is outside the range of 800 to 1100° C., a preferred sheet-like titanium-based porous body in terms of the conductivity and strength (maximum load) cannot be obtained.

C. Effect of Thickness of Sheet-Like Titanium-Based Porous Body

For the sheet-like titanium-based porous body according to the present invention, the thickness is specified to $4.0 \times 10^{-1}$ to 1.6 mm. The value was varied and the effect of the specific sheet thickness on the sheet properties was investigated.

Example 5

A titanium-based porous body was produced under the same conditions as in Example 1 except for changing the counterbore depth of the quartz setter with counterbore to 1.50 mm.

The resulting titanium-based porous body had a thickness of 1.5 mm, a void fraction of 621, a specific surface area of $7.3 \times 10^{-2}$ m²/g, a surface roughness of 4.2 μm, a conductivity of $3.09 \times 10^3$ S/cm, and a maximum load as measured by the bending test of 50.2 N.

In addition, the carbon concentration in the titanium-based porous body was 0.01%.

Comparative Example 6

A titanium-based porous body was produced under the same conditions as in Example 1 except that a frame-like powder-filling jig having a height from the surface of the BN setter of about 0.30 mm was used to fill the powder on the BN setter.

The resulting titanium-based porous body had a thickness of 0.30 mm, a void fraction of 74%, a specific surface area of $7.4 \times 10^{-2}$ m²/g, a surface roughness of 9.0 μm, a conductivity of $1.22 \times 10^3$ S/cm, and a maximum load as measured by the bending test of 0.8 N.

The above results were arranged in a table to obtain the following Table 4 (Relationship between Properties of Sheet-like Titanium-based Porous Body and Thickness of Porous Body).

TABLE 4

Relationship between Properties of Sheet-like Titanium-based Porous Body and Thickness of Porous Body

| (Thickness of porous body: mm) | Specific surface area m²/g | void fraction % | Thickness min | Surface roughness μm | Conductivity S/cm | Maximum load N |
|---|---|---|---|---|---|---|
| Example 1 (0.47) | $8.4 \times 10^{-2}$ | 64 | 0.47 | 3.7 | 2960 | 5.9 |
| Example 5 (1.5) | $7.3 \times 10^{-2}$ | 62 | 1.5 | 4.2 | 3090 | 50.2 |
| Comparative Example 6 (0.30) | $7.4 \times 10^{-2}$ | 74 | 0.3 | 9.0 | 1220 | 0.8 |

As is clear from the results of Table 4, in the sheet-like titanium-based porous body according to the present invention, the strength tends to increase as the thickness of the porous body increases. In addition, it was found that a sheet-like titanium-based porous body having a thickness less than $4.0 \times 10^{-1}$ which is the lower limit defined in Claim 1 (Comparative Example 6) cannot have a sufficient strength.

The invention claimed is:

1. A sheet-like titanium-based porous body having a specific surface area of $4.5 \times 10^{-2}$ to $1.5 \times 10^{-1}$ m²/g, a void fraction of 55 to 70%, a thickness of $4.0 \times 10^{-1}$ to 1.6 mm, a surface roughness of at least one surface of 8.0 μm or less, and conductivity 2020 S/cm or more and 3550 S/cm or less determined according to JIS K 7194, wherein the specific surface area is measured by a BET method according to JIS Z 8831:2013, wherein the surface roughness is the arithmetic mean roughness Ra determined according to JIS B 0601-2001, and wherein the void fraction is a pore ratio per unit volume of the sheet-like titanium-based porous body in percentage and calculated according to a following formula (A) based on a volume V (cm³) of the sheet-like titanium-based porous body, a mass M (g) of the sheet-like titanium-based porous body, and a true density D (g/cm³) of the sheet-like titanium-based material:

$$\text{Void fraction (\%)} = (1 - (M/V)/D) \times 100 \tag{A}$$

2. An electrode comprising the sheet-like titanium-based porous body according to claim 1.

3. The sheet-like titanium-based porous body according to claim 1, wherein the specific surface area is $5.0 \times 10^{-2}$ to $1.3 \times 10^{-1}$ m²/g, and wherein the void fraction is 55 to 68%.

4. The sheet-like titanium-based porous body according to claim 1, wherein the specific surface area is $7.0 \times 10^{-2}$ to $1.1 \times 10^{-1}$ m²/g, and wherein the void fraction is 60 to 66%.

5. The sheet-like titanium-based porous body according to claim 1, wherein the surface roughness of at least one surface is 0.1 μm or more and 8.0 μm or less.

6. The sheet-like titanium-based porous body according to claim 1, wherein the thickness is $4.0 \times 10^{-1}$ to 1.0 mm.

7. The sheet-like titanium-based porous body according to claim 1, wherein a carbon concentration is 0.05% by weight or less.

8. The sheet-like titanium-based porous body according to claim 1, wherein the titanium-based porous body is composed of a pure titanium, a pure titanium coated with a titanium nitride or a titanium silicide, or a composite material of a combination thereof.

9. The sheet-like titanium-based porous body according to claim 1, wherein a maximum load of the sheet-like titanium-based porous body is 4.6N or more in a bending strength test according to JIS Z 248.

10. The sheet-like titanium-based porous body according to claim 1, wherein a maximum load of the sheet-like titanium-based porous body is 14.7N or more in a bending strength test according to JIS Z 248.

11. The sheet-like titanium-based porous body according to claim 1, wherein the sheet-like titanium-based porous body is produced by sintering an irregular-shaped titanium-based powder in a dry and unpressurized system, wherein the irregular-shaped titanium-based powder has an average circularity of 0.50 to 0.90.

12. The sheet-like titanium-based porous body according to claim 11, wherein the irregular-shaped titanium-based powder has an average particle size of 10 to 50 μm, and a D90 of less than 75 μm.

\* \* \* \* \*